UNITED STATES PATENT OFFICE.

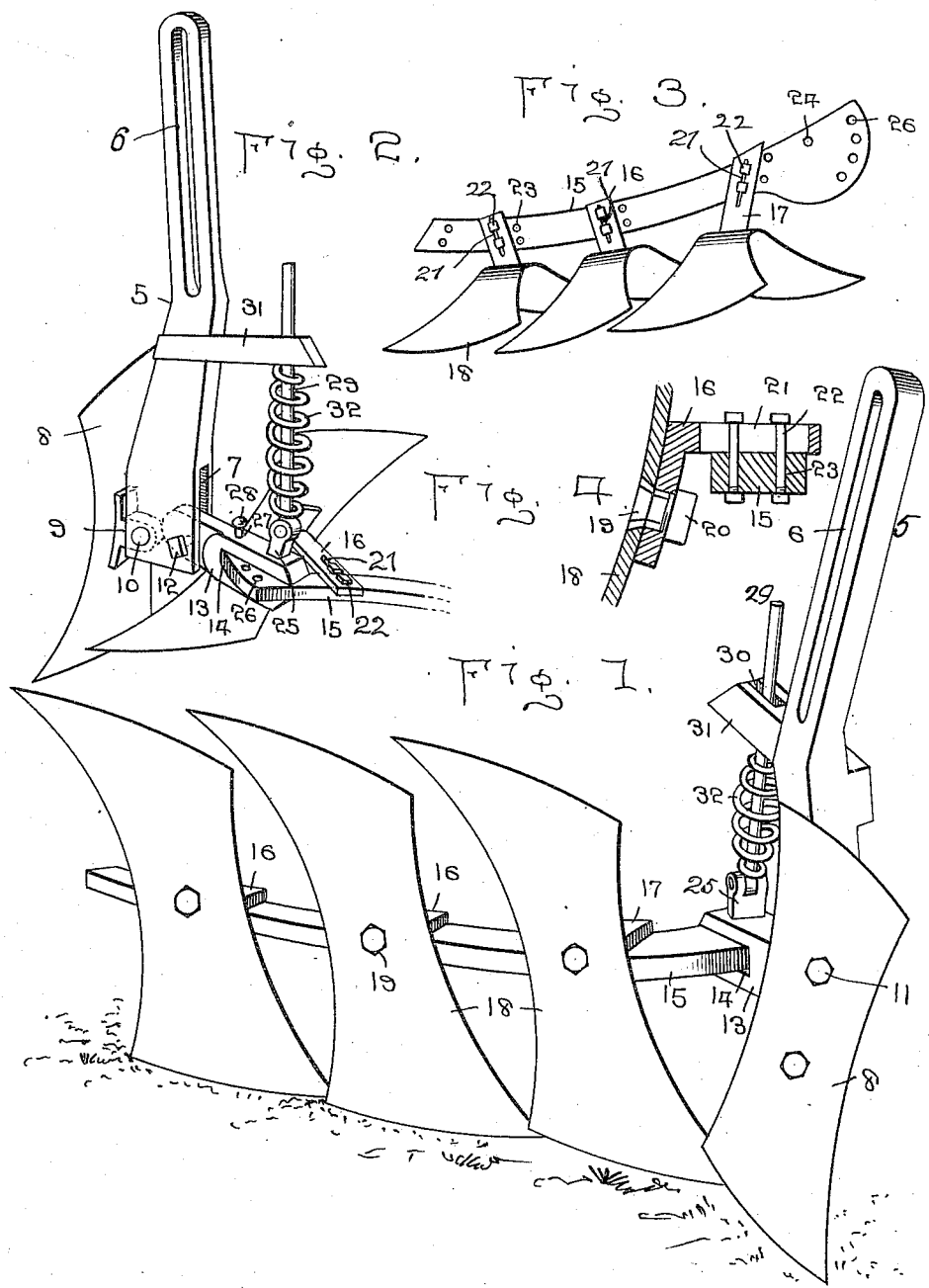

JOHN J. SPECHT AND WILLIAM J. WACHSMUTH, OF KALISPELL, MONTANA.

PLOW-COMB.

1,078,753.  Specification of Letters Patent.  Patented Nov. 18, 1913.

Application filed December 12, 1912. Serial No. 736,259.

*To all whom it may concern:*

Be it known that we, JOHN J. SPECHT and WILLIAM J. WACHSMUTH, citizens of the United States, residing at Kalispell, in the county of Flathead and State of Montana, have invented certain new and useful Improvements in Plow-Combs; and we do hereby declare the following to be a full, clear, and exact description of the invention, such as will enable others skilled in the art to which it appertains to make and use the same.

This invention relates to plow combs, and it is associated with subject matter contained in Patent No. 686,426, dated November 12, 1901.

The object of the present invention is to provide an improved form of shovel or combing blade which is adjustable and reversible.

Another object of the invention is to provide an improved form of adjustably mounted supporting bracket for the combing blades.

Other objects and advantages may be recited hereinafter and in the claims.

In the accompanying drawings, which supplement the following specification, Figure 1 is a perspective view of our improved plow attachment including the plow-comb. Fig. 2 is a perspective view of a portion of the attachment, viewed from the rear. Fig. 3 is a top plan view of the comb attachment, and, Fig. 4 is an enlarged detail sectional view through the comb.

Referring to these drawings, in which similar reference characters correspond with similar parts throughout the several views, the numeral 5 designates a standard or shank, provided with a slot 6, through which bolts or other fastening means, (not shown), may be inserted for adjustably securing the attachment on any plow-beam of ordinary construction. The bottom of the shank 5 is provided with a slot 7 and with apertures communicating with the slot. A plow plate 8 is carried in front of the shank 5 by means of a bracket 9 which is formed with an apertured lug, the latter extending into the slot 7 and being secured therein by means of a bolt 10 which extends through an aperture of the shank 5 and through the aperture of the lug. The plate 8 is preferably secured on the bracket 9 by means of two bolts 11. The plate 8 is reversible, or invertible, and the upper and lower ends are substantially alike, so that when one end becomes dull, the other end may be substituted therefor.

Extending into the rear part of the slot 7, and secured by a bolt or pivot 12, is a supporting arm 13 having a slot 14 therein, and within this slot is mounted a comb which consists of an arm or bar 15, brackets 16 and 17, and comb-blades or plates 18. These blades 18 are secured on the brackets 16 and 17, respectively, by means of bolts 19, the latter being preferably formed with polygonal heads and shanks, as shown in Fig. 4; but it should be understood that we may employ any form of bolt 19 of non-circular cross section so as to prevent relative rotation of the plates 18 and the brackets supporting them. However, when it is desired to reverse the plates, so as to substitute a sharp working point for a dull one, this may be quickly done by loosening the nut 20 sufficiently to allow the plate 18 to rotate freely.

The brackets 16 are each provided with a slot 21 through which bolts 22 extend for adjustably securing the brackets to the arm 15. These bolts extend through holes 23 in the bracket 15, and any desired number of these holes may be provided, so that the plates may be adjusted longitudinally of the arm 15 as well as laterally thereof. We preferably arrange the plates 18 in such relation to each other and to the plates 8 that the point of the first plate or blade is behind the heel of the plate 8, the point of the second blade being behind the heel of the first blade, and the point of the third blade being behind the heel of the second blade.

One end of the arm 15 is semicircular, and is provided with an aperture 24 through which extends a pivot member 25, for securing the arms 13 and 15 in pivotally adjustable relation to each other. The semicircular portion is also provided with apertures 26 arranged on an arc of a circle having its center at 24, and the arm 13 is apertured at 27 for the reception of a pin 28, the latter extending through one of the apertures 26 and adapted to extend through either of the other apertures 26; so that, by removing the pin 28 and swinging the arm forward or backward, the pin 28 may be engaged with one of the other holes 26, for securing the arm 15 in adjusted position.

The member 25 is pivotally connected with a rod 29, which extends up through a slot 30 of an arm 31 which is formed integrally with the shank 5 and extends rearward therefrom. A helical spring 32 surrounds the rod 29 and bears down upon the member 25 and up against the arm 31, so that said arm and spring operate to hold the arm 13 and the plow-comb carried thereby down in working position, to allow the same to be raised, in case of the engagement of the blade 18 with a fixed object, thereby preventing the comb from being broken by its contact with such object.

It will be seen that when the arm 13 is swung upward, the upper end of the member 25 essentially swings inward, thereby moving the lower end of the rod 29 in a forward direction; and so, the slot 30 is of sufficient length to allow the necessary forward or oscillating movement of the rod 29.

It will be seen that the upper and lower ends of the shank 5 are substantially vertical, while the medial portion thereof is inclined, so that the plate 8 will be located substantially under a plow-beam, to which the shank is to be attached.

It will be seen that we have provided a device of this character, which is fully capable of attaining the foregoing objects, and in a thoroughly practical and efficient manner.

We claim:—

1. A combing attachment for a plow, consisting of a shank, constructed for attachment to a plow, a blade-supporting arm carried by the shank, brackets supported by the arm and formed with depending and forwardly inclined apertured blade-supporting elements, apertured combing blades, securing bolts for retaining the combing blades on the blade-supporting brackets, said securing bolts each comprising a head of polygonal cross section and a shank of polygonal cross section, and the apertures of the combing blades and the supporting brackets being formed to snugly receive said bolts for retaining the blades in either of their several adjusted positions.

2. In a combing attachment for a plow, a supporting arm, constructed for attachment to a plow, combing blades, apertured supporting brackets for the combing blades, said supporting brackets being secured on said supporting arm, and means for normally securing the blades in rotatable position on the supporting brackets and allowing them to be rotated into different positions of adjustment.

In testimony whereof we have signed our names to this specification in the presence of two subscribing witnesses.

JOHN J. SPECHT.
WILLIAM J. WACHSMUTH.

Witnesses:
I. D. ROGNLIEN,
LELAND TANSEL.

---

Copies of this patent may be obtained for five cents each, by addressing the "Commissioner of Patents, Washington, D. C."